US008415846B2

(12) United States Patent
Best et al.

(10) Patent No.: US 8,415,846 B2
(45) Date of Patent: Apr. 9, 2013

(54) STATOR UNIT WITH MOISTURE-PROOF SEALING

(75) Inventors: Dieter Best, Ingelfingen (DE); Matthias Maschke, Kupferzell (DE)

(73) Assignee: EBM-Papst Mulfingen GmbH & Co. KG, Mulfingen (DE)

( * ) Notice: Subject to any disclaimer, the term of this patent is extended or adjusted under 35 U.S.C. 154(b) by 422 days.

(21) Appl. No.: 12/696,148

(22) Filed: Jan. 29, 2010

(65) Prior Publication Data
US 2010/0187920 A1     Jul. 29, 2010

(30) Foreign Application Priority Data
Jan. 29, 2009   (EP) ..................................... 09151601

(51) Int. Cl.
*H02K 5/02* (2006.01)
(52) U.S. Cl. .................. 310/89; 310/43; 310/87; 310/91
(58) Field of Classification Search ............... 310/43, 310/67 R, 71, 87–89, 91, 254.1; *H02K 5/02, H02K 5/10*
See application file for complete search history.

(56) References Cited

U.S. PATENT DOCUMENTS

| 4,707,627 | A | * | 11/1987 | Best | 310/71 |
|---|---|---|---|---|---|
| 5,783,881 | A | * | 7/1998 | Best et al. | 310/68 C |
| 6,005,310 | A | * | 12/1999 | Mosciatti et al. | 310/12.02 |
| 6,563,239 | B1 | * | 5/2003 | Baer et al. | 310/51 |
| 7,101,157 | B2 | * | 9/2006 | Bamberger et al. | 417/368 |
| 7,211,914 | B2 | * | 5/2007 | Hofmann et al. | 310/88 |
| 7,211,916 | B2 | * | 5/2007 | Hahn et al. | 310/91 |
| 7,939,978 | B2 | * | 5/2011 | Best et al. | 310/71 |
| 2006/0006094 | A1 | | 1/2006 | Hofmann et al. | |
| 2006/0192448 | A1 | * | 8/2006 | Hill | 310/88 |

FOREIGN PATENT DOCUMENTS

| DE | 202 07 233 U1 | 9/2003 |
|---|---|---|
| DE | 20 2004010513 U1 | 11/2005 |
| EP | 1361644 A2 * | 11/2003 |
| WO | WO 2004/013944 A | 2/2004 |

* cited by examiner

*Primary Examiner* — Tran Nguyen
*Assistant Examiner* — Naishadh Desai
(74) *Attorney, Agent, or Firm* — Brinks Hofer Gilson & Lione

(57) ABSTRACT

A stator unit for an electric motor, in particular an external rotor motor, includes a stator with a stator laminate stack and stator windings and a stator bushing and a stator flange which is formed at one end. A housing flange of a housing for accommodating a motor controller or the like is fastened on the stator flange, and with motor connection contacts, which run from the stator through through-openings in the housing flange, and with fastening means, which run through fastening holes in the housing flange and are fastened in the stator. A sealing disk is arranged between the stator and the housing flange. The sealing disk has sealing regions made from elastic plastic, which are arranged and designed in such a way that direct and/or indirect sealing of the through-openings and/or the fastening holes is provided against the ingress of moisture.

19 Claims, 5 Drawing Sheets

STATOR UNIT WITH MOISTURE-PROOF SEALING

CROSS REFERENCE TO RELATED APPLICATIONS

This application claims the benefit of priority to EP 09151601.3 filed Jan. 29, 2009, the entire contents of which are each hereby incorporated herein by reference.

FIELD OF INVENTION

The present invention relates to a stator unit for an electric motor, in particular an external rotor motor comprising a stator with a stator laminate stack and stator windings and a stator bushing and a stator flange which is formed at one end and on which a housing flange of a housing for accommodating a motor controller or the like is fastened, and with motor connection contacts, which run from the stator through through-openings in the housing flange, and with fastening means, which run through fastening holes in the housing flange and are fastened in the stator.

BACKGROUND

In such a known stator unit there is the problem of it being possible for moisture which has passed into the stator to pass from there into the housing fastened on the housing flange, which housing contains the motor electronics, since the through-openings provided between the stator and the motor housing for the motor connection contacts and for the fastening means make it possible for the moisture to pass through.

SUMMARY

The present invention is based on the object of making it possible to provide effective sealing which is inexpensive and makes simple assembly possible.

According to the invention, this is achieved by virtue of the fact that a sealing disk is arranged between the stator and the housing flange and has sealing regions made from elastic plastic, which are arranged and designed in such a way that direct and/or indirect sealing of the through-openings and/or of the fastening holes is provided against the ingress of moisture. According to the invention, all of the necessary sealing means are therefore concentrated together on the sealing disk, with the result that there is no need for individual sealing. The sealing disk can be produced independently of the stator and the housing flange and can be prefitted on the stator, and then the sealing can be provided during final fitting of the stator and the housing flange. The manufacture according to the invention in the form of a two-component injection-molded part results in favorable production costs and dispenses with the need for a large number of individual sealing elements to be produced. The sealing disk according to the invention in this case means that it is not necessary for each individual opening to be sealed separately, but it is also possible to achieve indirect sealing with the sealing disk according to the invention by virtue of the fact that sealed chambers are produced in which the respective openings are arranged.

Advantageous embodiments of the invention are included in the dependent claims and the invention will be explained in more detail with reference to the exemplary embodiment illustrated in the attached drawings. Furthermore, the present invention relates to a sealing disk for use with the stator unit according to the invention.

BRIEF DESCRIPTION OF THE DRAWINGS

In the figures below, the same parts are denoted by in each case the same reference numerals.

DETAILED DESCRIPTION

Figure 1:
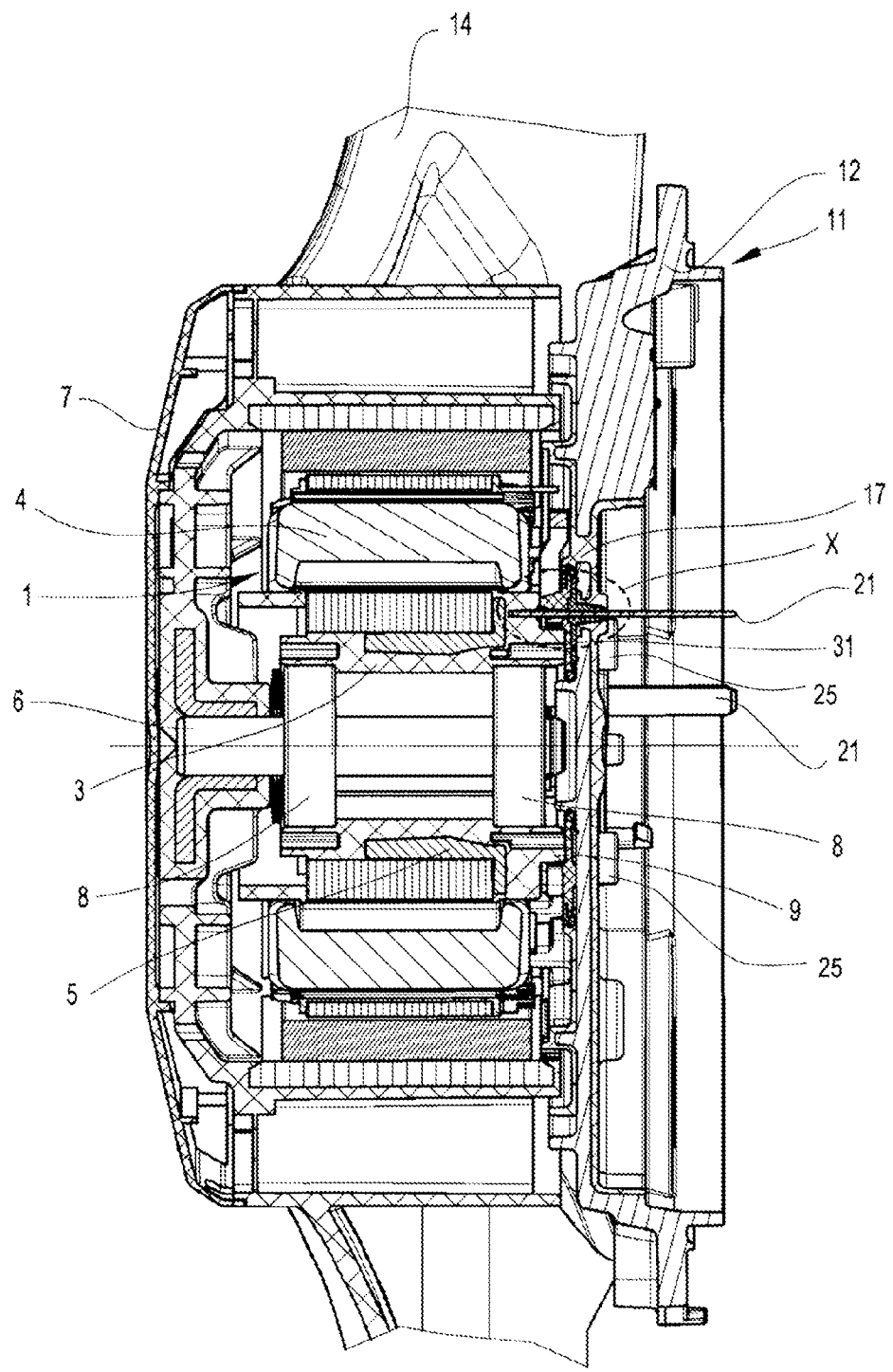
FIG. 1 shows a cross section through a stator unit according to the invention.
Figure 3:
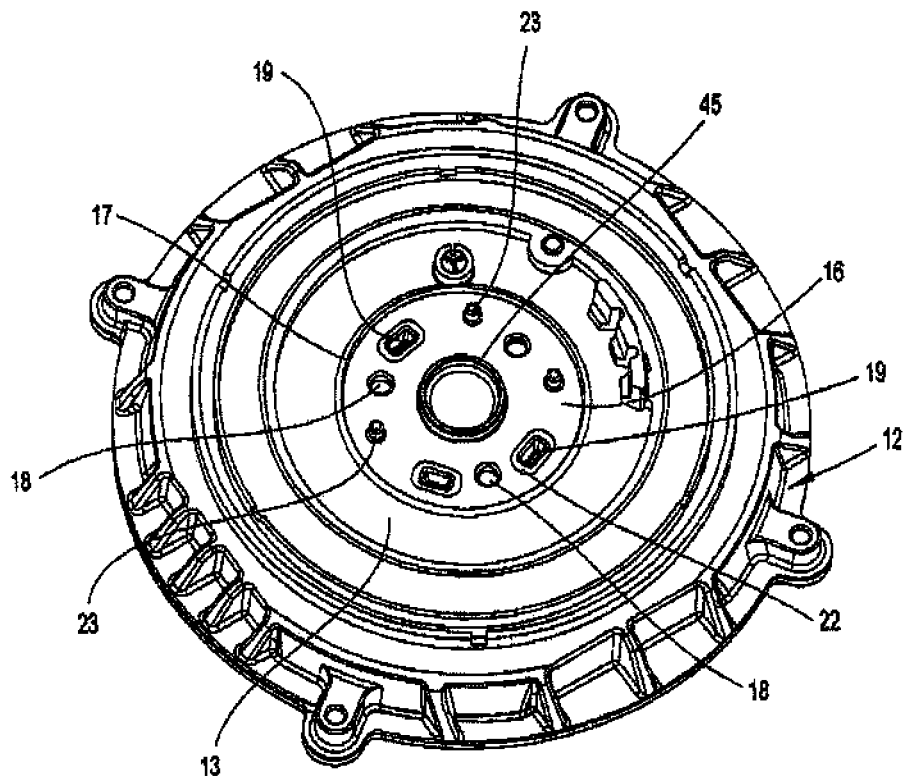
FIG. 3 shows a view of a housing flange of the stator unit shown in FIG. 1.

The present invention relates to a stator unit for an electric external rotor motor, which comprises a stator 1, which is formed from a stator laminate stack 2 with stator windings 4 and a stator bushing 3 (see FIG. 1). The stator bushing 3 is part of an inner and end-side plastic injection-molded encapsulation of the stator laminate stack 2 and contains, at that end of the laminate stack 2 which is on the housing flange side, a metallic bushing 5 which has been pressed into the interior of the laminate stack 2 and has domes 26 for fitting on the housing flange 12. Stator windings 4 are wound on the stator laminate stack 2. A rotor shaft 6 of an external rotor 7 is mounted by means of bearings 8 within the stator bushing 3. As has been mentioned above, the stator bushing 3 at one end contains the bushing 5, which forms a stator flange 9, on which a housing 11 for accommodating motor electronics is fastened. Of the housing 11, FIG. 1 illustrates a housing flange 12, in particular in the form of a cooling flange, which is connected directly to the stator flange 9. The outer diameter of the housing flange 12 is greater than the outer diameter of the stator 1; however, it approximately corresponds to the outer diameter of the external rotor 7. The housing flange 12 is preferably made from aluminum and is partially surrounded by a plastic injection-molded encapsulation 13 for insulation on both sides. If the external rotor 7 at the same time acts as a hub of a fan, as is shown in the exemplary embodiment illustrated, fan blades 14 are fastened on the outer circumference of the external rotor 7. The housing flange 12 (see FIG. 3) has, in its central region, a bearing section 16, which is preferably circular in shape and is surrounded circumferentially by an axially protruding peripheral web 17. This peripheral web 17 is formed by the plastic injection-molded encapsulation 13. The bearing section 16 can likewise be provided with the plastic injection-molded encapsulation 13. Preferably three fastening holes 18, which are offset with respect to one another through 120°, are contained within the bearing section 16 and, in the example illustrated, three through-openings 19 for plugging through tongue-shaped motor connection contacts 21, which are connected at one end to the stator coils 4. The through-openings 19 are formed in insulating bushings 22 formed by the plastic injection-molded encapsulation 13 within the bearing section 16. In each case three locating pins 23, which are offset with respect to one another, are integrally formed on the bearing section 16 between the fastening holes 18.

Figure 2:
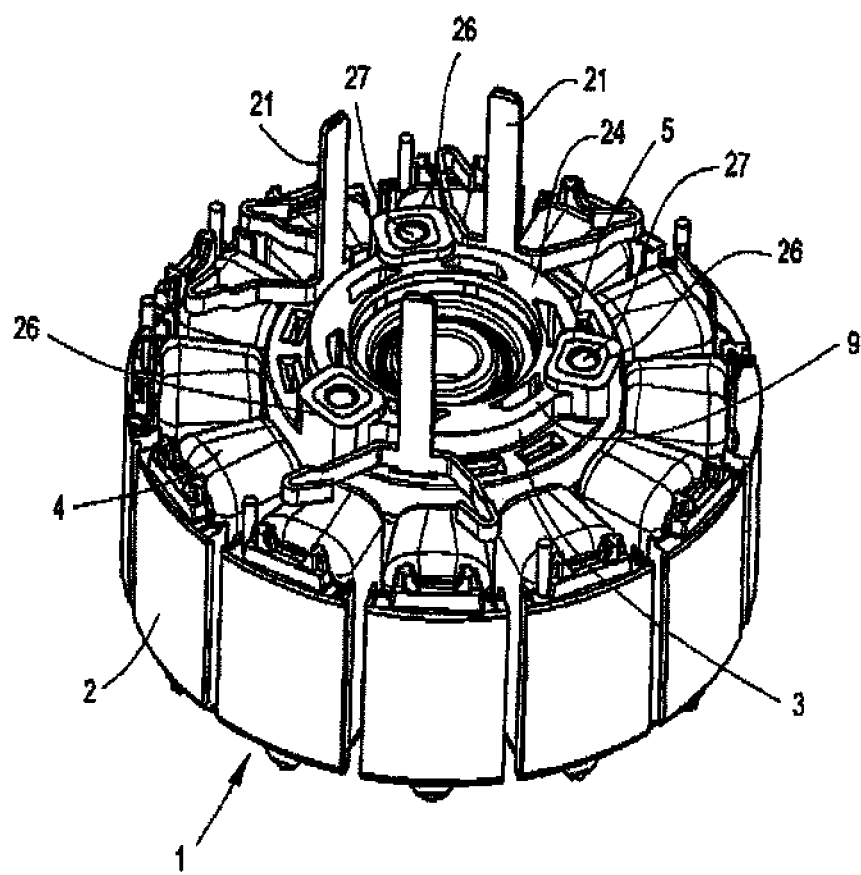
FIG. 2 shows a perspective view of a stator of the stator unit shown in FIG. 1.

The stator flange 9 (see FIG. 2) has an annular end face 24, on which preferably three domes 26 are provided, which are offset with respect to one another through 120° and have screw-in openings 27. The domes 26 are part of the metallic bushing 5, which has been pressed into the stator laminate stack 2. In the fitted state, as illustrated in FIG. 1, the screw-in openings 27 are aligned with the screw holes 18, and fastening screws 25 can be screwed in from the side of the cooling flange 12, as a result of which the stator 1 is connected to the cooling flange 12. The domes 26 protrude in the axial direction with their end face with respect to the end face 24 of the stator flange 9. In this case, the domes 26 are likewise encapsulated by a plastic injection-molded encapsulation of the stator 1.

Figure 4:
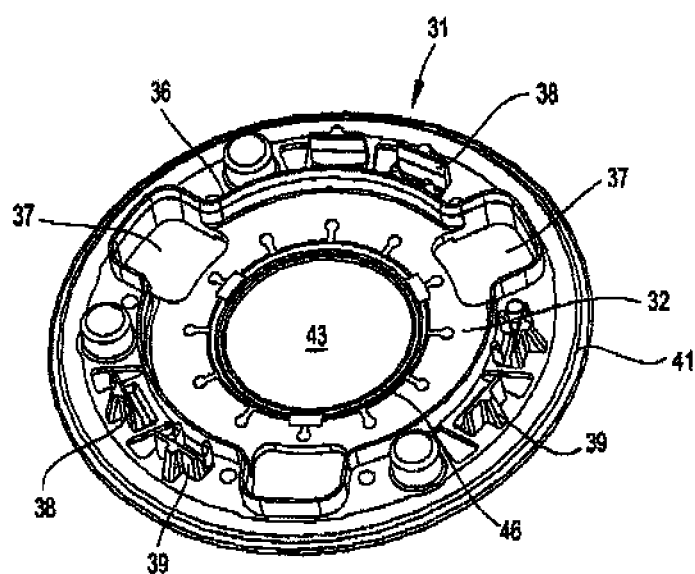
FIG. 4 shows a rear view of a sealing disk according to the invention.
Figure 5:
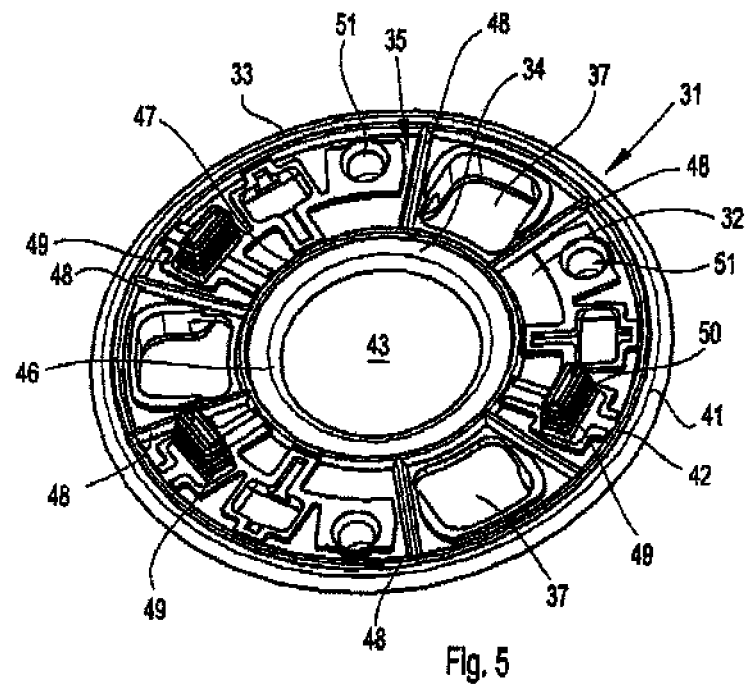
FIG. 5 shows a front view of a sealing disk according to the invention.
Figure 6:
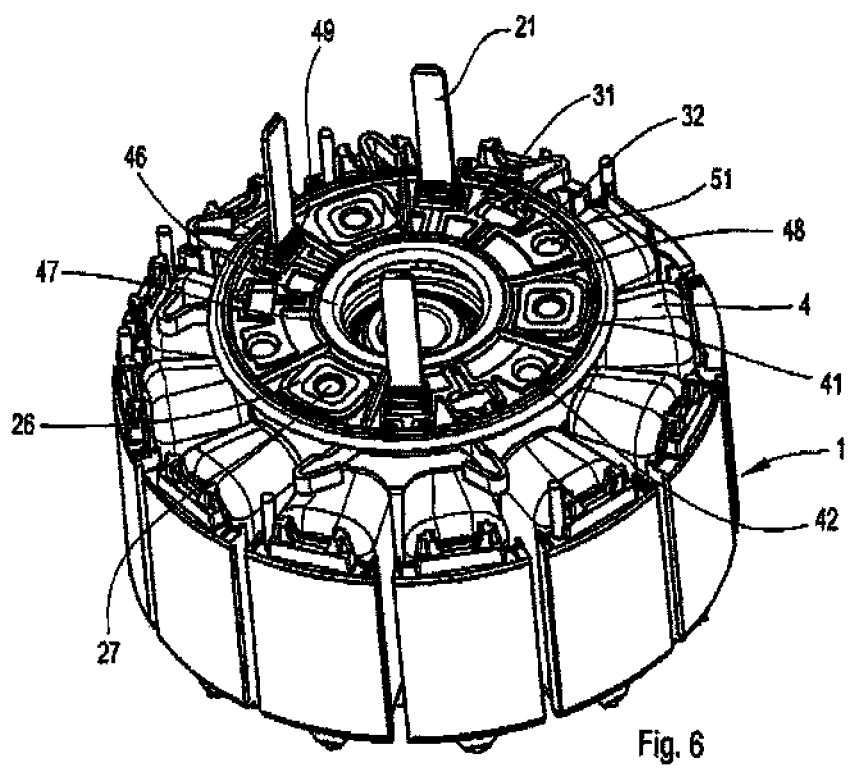
FIG. 6 shows a perspective view of a stator according to the invention with a prefitted sealing disk according to the invention.
Figure 7:
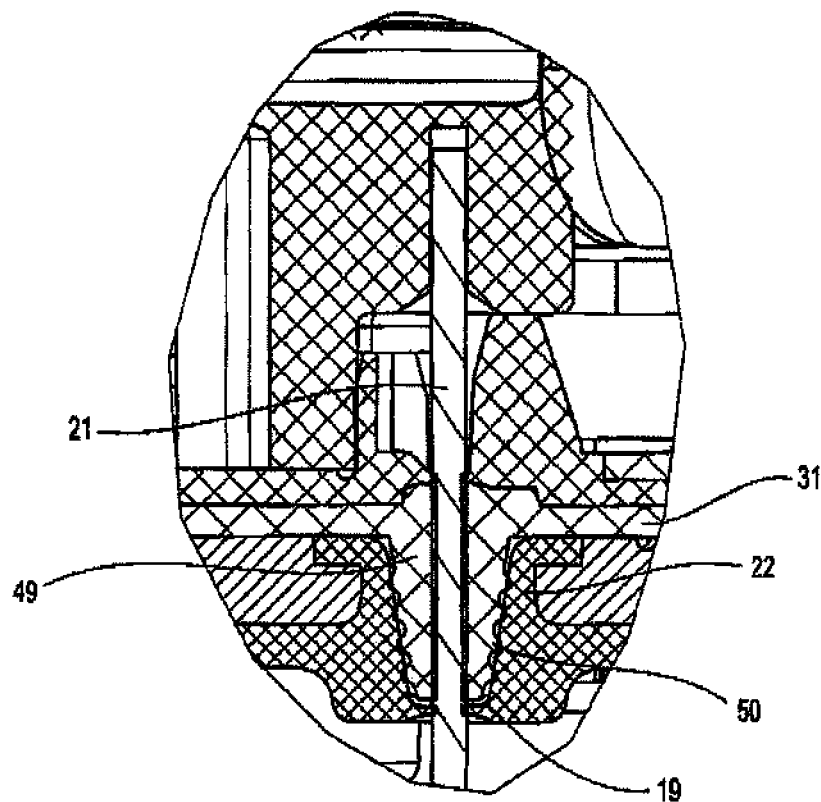
FIG. 7 shows a detail at X in FIG. 1 in an enlarged illustration.

Moisture can enter the interior of the stator 1 from the outside through a circumferential fitting gap, which is provided between the stator 1 and the cooling flange 12 and is therefore also necessary for preventing the external rotor 7 from coming into contact with the cooling flange 12. This moisture can pass via the through-openings 19 and the fastening holes 18 into the interior of the electronics housing, which is fastened on the housing flange 12. In order to largely prevent the ingress of moisture into the electronics housing and therefore to adhere to the relatively stringent IP protection class, in particular IP-69K, the invention now provides that a sealing disk 31 is arranged between the stator flange 9 and the housing flange 12 in the region of the bearing section 16. This sealing disk is illustrated in FIGS. 4 and 5. The sealing disk 31 comprises a supporting body 32 and sealing regions which are formed on the supporting body 32, to be precise an outer sealing region 33 and an inner sealing region 34 as well as a central sealing region 35. Indirect and/or direct sealing of the through-openings 19 and the fastening holes 18 takes place by virtue of these sealing regions 33, 34, 35, with the result that no moisture can pass from the stator 1 into the electronics housing 11. The sealing regions 33, 34, 35 are made from an elastic sealing material consisting of plastic, and the supporting body 32 is made from a hard plastic material. The hard plastic material is preferably ultramide, with this being a glass-fiber-reinforced polyamide, and the relatively soft sealing material is preferably Santoprene, a thermoelastic elastomer (TPE), which has the special property of adhering to the hard material. The IP protection class for road vehicles pursuant to DIN 40050, part 9, to be precise IP69K or alternatively IP6K9K, which is achieved by the sealing according to the invention states that the sealing firstly needs to be dustproof and secondly needs to be sealed with respect to high-pressure steam jets. The sealing disk 31 according to the invention is preferably produced in the form of a two-component plastic injection-molded part (2C part). This results in a one-piece, integral connection between the sealing regions 33, 34 and 35 and the supporting body 32. The sealing disk 31 has, on its side facing the stator 1, a surrounding, axially protruding circumferential web 36, which, in the fitted state of the sealing disk 31 on the stator flange 9, circumferentially surrounds the end face 24 of said stator flange 9 including the domes 26. In this case, the domes 26 run through correspondingly matched openings 37 in the sealing disk 31. Furthermore, the sealing disk 31 has, on its side facing the stator 1, guide and supporting shoulders 38, 39, with openings for plugging through the tongue-shaped motor connection contacts 21 being provided in guide shoulders 39. The sealing disk 31 is supported on the end-side injection-molded encapsulation of the stator laminate stack 2 in the plugged-on state of the sealing disk 31 via the shoulders 38. The outer sealing region 33 of the sealing disk 31 comprises a surrounding sealing bead 41, which has a sealing lip 42 protruding in the axial direction towards the cooling flange 12. The sealing bead 41 and the sealing lip 42 surround the circular sealing disk 31. The sealing bead 41 seals off a gap between the peripheral web 17 and the sealing disk 31. The sealing disk 31 has a central opening 43, whose opening diameter is dimensioned such that it surrounds a hollow-cylindrical shoulder 45 on the bearing section 16 of the housing flange 12 in the fitted state. The inner sealing region 34 comprises a sealing bead 46, which surrounds the central opening 43 and which likewise has an axially projecting sealing lip 47. The sealing bead 46 seals off a gap between the hollow-cylindrical shoulder 45 and the sealing disk 31. The two sealing beads 41 and 46 are connected to one another by radially running sealing webs 48, which also form the central sealing region 35. These radial sealing webs 48 protrude axially in the direction towards the housing flange 12, and the bearing faces of the sealing lips 42, 47 and of the radial sealing webs 48 are located in a common sealing plane which runs parallel to the supporting body 32 and bear in sealing fashion against the bearing section 16 in the fitted state. In the region of the through-openings 19 for the motor connection contacts 21, sealing bodies 49 which are made from the same material as the remaining sealing regions 33, 34, 35 and belong to the central sealing region 35, are injection molded on that side of the sealing disk 31 which faces the housing flange 12. These sealing bodies 49 likewise have through-openings for the motor connection contacts 21 and are preferably designed to be conical such that the thickness of their wall tapers towards the upper end. Furthermore, these sealing bodies 49 have circumferentially running sealing beads 50, which are arranged one behind the other in stepwise fashion and whose common outer surface likewise runs conically. These sealing bodies 49 are dimensioned in such a way that they can be plugged into the through-openings 19 in the insulating bushings 22, the through-openings 19 having a conical mating profile with respect to the sealing bodies 49 (see FIG. 7), with the result that the through-openings 19 taper conically inwards. The sealing bodies 49, in the plugged-in state, seal off directly the through-openings 19 and the through-openings provided therein for the motor connection contacts 21, with the result that it is not possible for any moisture to enter the electronics housing from the stator 1 through said openings. The outer sealing region 33 with the sealing bead 41 and the sealing lip 42 and the inner sealing region 34 with the sealing bead 46 and the sealing lip 47 represent indirect sealing of the openings 37 and the holes 18 since, in conjunction with the radial sealing webs 48 which also form the central sealing regions 35, sealing chambers are formed in which the openings 37 for the domes 26 and the holes 18 are located. Moisture cannot enter these sealing chambers from the outside since this is prevented by the outer and inner sealing regions 35, 34 and the radial sealing webs 48.

It can furthermore be seen that depressions 51 in the form of blind holes are provided in the sealing disk 31, with the locating pins 23 protruding into said depressions, with the result that an interlocking connection with the housing flange 12 is provided.

The design of the sealing disk 31 according to the invention makes it possible for said sealing disk to be capable of being prefitted on the stator 1 and then for the stator 1 with the prefitted sealing disk 31 to be capable of being connected to the cooling or housing flange 12.

It is understood that the examples and embodiments described herein are for illustrative purposes only and that various modifications or changes in light thereof will be suggested to persons skilled in the art and are to be included within the spirit and purview of this application and scope of the appended claims.

The invention claimed is:

1. A stator unit for an electric motor, the stator unit comprising:
   a stator with a stator laminate stack and with stator windings;
   a stator bushing;
   a stator flange formed at one end of the stator bushing with a housing flange of a housing for accommodating a motor controller fastened to the stator flange;
   motor connection contacts running from the stator through through-openings in the housing flange;
   fasteners running through fastening holes in the housing flange and fastened in the stator; and
   a sealing disk arranged between the stator and the housing flange, the sealing disk having sealing regions made from elastic plastic, the sealing regions being arranged and shaped in such a way that at least one of the through-openings and the fastening holes is sealed against ingress of moisture,
   wherein the housing flange has a central region with a bearing section circumferentially surrounded by an axially protruding peripheral web formed by a plastic injection-molded encapsulation of the housing flange.

2. The stator unit according to claim 1, wherein the bearing section is circular.

3. The stator unit according to claim 1, wherein three of the fastening holes, which are offset with respect to one another by 120°, as well as through-openings for plugging through the motor connection contacts are formed within the bearing section.

4. The stator unit according to claim 1, wherein the through-openings are formed in insulating bushings, which are formed by the plastic injection-molded encapsulation of the housing flange within the bearing section.

5. The stator unit according to claim 1, wherein the stator flange has an annular end face, on which three domes are provided, which are offset with respect to one another and have screw-in openings, which are aligned with the fastening holes in a fitted state.

6. The stator unit according to claim 1, wherein the sealing disk is arranged in the region of the bearing section.

7. The stator unit according to claim 1, wherein the sealing disk is formed from a supporting body with the sealing regions formed thereon, the sealing regions comprising an outer sealing region, an inner sealing region and a central sealing region, and the supporting body being made from a plastic hard material.

8. The stator unit according to claim 1, wherein the sealing disk is produced in the form of a two-component plastic injection-molded part.

9. The stator unit according to claim 1, wherein the sealing disk has, on its side facing the stator, a surrounding, axially protruding circumferential web, which, in the fitted state of the sealing disk on the stator flange, circumferentially surrounds the end face of said stator flange.

10. The stator unit according to claim 1, wherein domes run through disk openings in the sealing disk, the disk openings being matched to the domes, and the sealing disk has, on its side facing the stator, guide shoulders, which have openings for plugging through the motor connection contacts.

11. The stator unit according to claim 7, wherein the outer sealing region of the sealing disk comprises a surrounding first sealing bead, which has a sealing lip protruding in the axial direction towards the cooling flange, and the first sealing bead and the sealing lip surround the circular sealing disk.

12. The stator unit according to claim 1, wherein the sealing disk has a central opening, whose opening diameter is dimensioned such that it surrounds a hollow-cylindrical shoulder on the bearing section of the housing flange in the fitted state.

13. The stator unit according to claim 12, wherein the inner sealing region comprises a second sealing bead, which surrounds the central opening and which has an axially projecting sealing lip and seals off a gap between the hollow-cylindrical shoulder and the sealing disk.

14. The stator unit according to claim 13, wherein the first and second sealing beads are connected to one another by radially running sealing webs, which also form the central sealing region and protrude axially in the direction towards the housing flange, the bearing faces of the sealing lips and of the radial sealing webs being located in a common sealing plane which runs parallel to the supporting body and bearing in sealing fashion against the bearing section in the fitted state.

15. The stator unit according to claim 1, wherein sealing bodies, which are made from the same material as the remaining sealing regions and have the through-openings for the motor connection contacts, are integrally formed on that side of the sealing disk which faces the housing flange in the region of the through-opening for the motor connection contacts.

16. The stator unit according to claim 15, wherein the sealing bodies have a conical shape such that they have a wall thickness that tapers towards an upper free end and wherein the sealing bodies each have a plurality of circumferentially running third sealing beads on the conical shape with a conical enveloping outer surface.

17. The stator unit according to claim 15, wherein the sealing bodies are dimensioned in such a way that they can be plugged into the through-openings in the insulating bushings, the through-openings having a conical mating profile with respect to the sealing bodies, the through-openings conically tapering inwards.

18. The stator unit according to claim 1, wherein depressions in the form of blind holes are provided in the sealing disk, with guide shoulders formed in the bearing section of the housing flange and protruding into the depressions.

19. A sealing disk for use in a stator unit according to claim 1.

* * * * *